(12) United States Patent
Nakahira et al.

(10) Patent No.: US 12,047,796 B2
(45) Date of Patent: Jul. 23, 2024

(54) WIRELESS COMMUNICATION PERFORMANCE MEASUREMENT METHOD FOR WIRELESS COMMUNICATION SYSTEM, WIRELESS COMMUNICATION PERFORMANCE MEASUREMENT SYSTEM AND WIRELESS BASE STATION

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 323 days.

(21) Appl. No.: 17/603,427

(22) PCT Filed: Apr. 13, 2020

(86) PCT No.: PCT/JP2020/016352
§ 371 (c)(1),
(2) Date: Oct. 13, 2021

(87) PCT Pub. No.: WO2020/213580
PCT Pub. Date: Oct. 22, 2020

(65) Prior Publication Data
US 2022/0191723 A1    Jun. 16, 2022

(30) Foreign Application Priority Data
Apr. 16, 2019   (JP) .................................. 2019-078173

(51) Int. Cl.
*H04W 24/08*   (2009.01)

(52) U.S. Cl.
CPC .................................. *H04W 24/08* (2013.01)

(58) Field of Classification Search
None
See application file for complete search history.

(56) References Cited

U.S. PATENT DOCUMENTS

2018/0167830 A1* 6/2018 Grischy ................ H04W 24/04
2020/0374713 A1* 11/2020 Bogatin ............... H04B 7/0617
(Continued)

OTHER PUBLICATIONS

I-O Data Device, Inc., Wireless LAN environment survey service, literature, Feb. 26, 2019 (Reading Day), https://www.iodata.jp/support/service/iss/sitesurvey/.
(Continued)

*Primary Examiner* — Marcus Smith
(74) *Attorney, Agent, or Firm* — Harness, Dickey & Pierce, P.L.C.

(57) ABSTRACT

A wireless communication system includes a plurality of wireless base stations and a measurement station, each wireless base station including a wireless communication unit, a wireless information collection unit, and a measurement result collection unit, the measurement station being configured to control the plurality of wireless base stations, wherein the measurement station generates a measurement condition based on wireless environment information collected by the wireless information collection unit of each wireless base station and notifies each wireless base station of a measurement control signal corresponding to the measurement condition, each wireless base station sends traffic addressed to a subordinate wireless terminal station or broadcast traffic at the same time in accordance with the notified measurement control signal, a measurement result collection unit of a wireless base station that is a measure- (Continued)

ment target measures wireless communication performance and notifies the measurement station of the measured performance, and the measurement station acquires the wireless communication performance collected by the wireless base station that is the measurement target.

15 Claims, 7 Drawing Sheets

(56) References Cited

U.S. PATENT DOCUMENTS

| | | | |
|---|---|---|---|
| 2020/0374719 A1* | 11/2020 | Wang | H04W 24/04 |
| 2021/0235340 A1* | 7/2021 | Moosavi | H04W 36/0094 |
| 2022/0256316 A1* | 8/2022 | Takano | H04B 7/06 |

OTHER PUBLICATIONS

Toshiro Nakahira et al., Dynamic Control Method for Multi Radio Interface with Strategy Management Architecture for Wireless Resource Optimization (WiSMA), IEICE Technical Report, vol. 119, No. 8, 2019, pp. 1-6.

* cited by examiner

| BASE STATION NUMBER | BSSID OF BASE STATION | BSSID OF BEACON | RECEPTION POWER OF BEACON | RECEPTION CHANNEL OF BEACON |
|---|---|---|---|---|
| 10-1 | ab:cd:ef:ab:cd:ef | aa:aa:aa:aa:aa:aa | -70dBm | 36 |
| | | bb:bb:bb:bb:bb:bb | -65dBm | 48 |
| | | cc:cc:cc:cc:cc:cc | -80dBm | 1 |
| | | ⋮ | ⋮ | ⋮ |
| 10-2 | ⋮ | ⋮ | ⋮ | ⋮ |
| ⋮ | ⋮ | ⋮ | ⋮ | ⋮ |

Fig. 4

| MEASUREMENT NUMBER | MEASUREMENT BASE STATION NUMBER | DESTINATION TERMINAL STATION NUMBER | MEASUREMENT TRAFFIC | ... |
|---|---|---|---|---|
| 1 | 10-1 | 30-1 | DOWNLINK UDP 50 Mbps DESTINATION: SUBORDINATE TERMINAL STATION | ... |
| | 10-2 | NONE | DOWNLINK UDP 50 Mbps DESTINATION: BROADCAST TIME: 30 SECONDS | ... |
| | 10-3 | NONE | DOWNLINK UDP 50 Mbps DESTINATION: BROADCAST TIME: 30 SECONDS | ... |
| | ⋮ | ⋮ | ⋮ | ⋮ |
| 2 | 10-1 | NONE | DOWNLINK UDP 50 Mbps DESTINATION: BROADCAST TIME: 30 SECONDS | ... |
| | 10-2 | 30-2 | DOWNLINK UDP 50 Mbps DESTINATION: SUBORDINATE TERMINAL STATION | ... |
| | ⋮ | ⋮ | ⋮ | ⋮ |
| ⋮ | ⋮ | ⋮ | ⋮ | ⋮ |

Fig. 5

| MEASUREMENT NUMBER | LOCATION OF TERMINAL STATION | THROUGHPUT | DELAY | SITUATION | ... |
|---|---|---|---|---|---|
| 1 | A | 35 Mbps | 10 msec | | ... |
| 2 | B | 29 Mbps | 4 msec | | ... |
| 3 | C | — | 8 msec | COMMUNICATION DISCONNECTION | ... |
| ⋮ | ⋮ | ⋮ | ⋮ | ⋮ | ⋮ |

WIRELESS COMMUNICATION PERFORMANCE MEASUREMENT METHOD FOR WIRELESS COMMUNICATION SYSTEM, WIRELESS COMMUNICATION PERFORMANCE MEASUREMENT SYSTEM AND WIRELESS BASE STATION

CROSS-REFERENCE TO RELATED APPLICATIONS

This application is a 371 U.S. National Phase of International Application No. PCT/JP2020/016352 filed on Apr. 13, 2020, which claims priority to Japanese Application No. 2019-078173 filed on Apr. 16, 2019. The entire disclosures of the above applications are incorporated herein by reference.

TECHNICAL FIELD

The present invention relates to a wireless communication performance measurement method, a wireless communication performance measurement system, and a wireless base station of a wireless communication system which make it possible to measure system performance of wireless connection services in an area in which a plurality of wireless base stations are installed.

BACKGROUND ART

Standards of high-speed wireless communication systems using radio waves in an unlicensed band include IEEE 802.11 wireless LAN standards, and various standards such as 11a, 11b, 11g, 11n, and 11ac are specified. Radio frequency bands, wireless transmission techniques, and wireless transmission rates used in these standards are different from each other. The 11b standard has a maximum wireless transmission rate of 11 Mbps using the 2.4 GHz band, the 11a standard has a maximum wireless transmission rate of 54 Mbps using the 5 GHz band, and the 11g standard has a maximum wireless transmission rate of 54 Mbps using the 2.4 GHz band. The 11n standard has a maximum wireless transmission rate of 600 Mbps using the 2.4 GHz band and the 5 GHz band, and the 11ac standard has a maximum wireless transmission rate of 6,900 Mbps using the 5 GHz band. These various IEEE 802.11 wireless LAN standards are backward-compatible, and can also be used in mixed environments.

In public areas such as stations, airports, or shopping malls, wireless connection services are provided for the purpose of attracting customers and improving user satisfaction. In such an environment, a plurality of wireless base stations may be installed in an area in order to accommodate many users, and whether wireless communication performance assumed for a wireless connection service can be provided after installation may be measured (Non Patent Literature 1).

CITATION LIST

Non Patent Literature

[Non Patent Literature 1] https://www.iodata.jp/support/service/iss/sitesurvey/

SUMMARY OF THE INVENTION

Technical Problem

When wireless communication performance of a wireless connection service is measured in an area in which a plurality of wireless base stations are installed, testing the wireless base stations one by one in order can be considered. However, wireless base stations installed close to each other may suffer from radio wave interference mutually depending on used radio channels, and thus measuring the wireless base stations one by one does not enable measurement of performance of the entire area.

In this case, a wireless terminal station for testing is connected to each wireless base station and each wireless base station simultaneously performs wireless communication with the same timing, thereby measurement can be performed with mutual radio wave interference included. However, there is a problem that a large number of personnel and operations are required for testing work. In addition, wireless communication environments differ depending on the position of a wireless terminal station. Thus, to measure one wireless base station, the wireless terminal station needs to be disposed at a plurality of locations such as directly below the wireless base station, at a remote location, and at an intermediate point therebetween. This causes a problem that it takes much time and effort for work operation or preparation required for wireless communication performance measurement.

An object of the present invention is to provide a wireless communication performance measurement method, a wireless communication performance measurement system, and a wireless base station of a wireless communication system which make it possible to measure wireless communication performance of a wireless connection service without disposing a wireless terminal station for each wireless base station in an environment in which radio wave interference occurs between wireless base stations.

Means for Solving the Problem

According to a first invention, there is provided a wireless communication system including a plurality of wireless base stations and a measurement station, each wireless base station including a wireless communication unit, a wireless information collection unit, and a measurement result collection unit, the measurement station being configured to control the plurality of wireless base stations, wherein the measurement station generates a measurement condition based on wireless environment information collected by the wireless information collection unit of each wireless base station and notifies each wireless base station of a measurement control signal corresponding to the measurement condition, each wireless base station sends traffic addressed to a subordinate wireless terminal station or broadcast traffic at the same time in accordance with the notified measurement control signal, a measurement result collection unit of a wireless base station that is a measurement target measures wireless communication performance and notifies the measurement station of the measured performance, and the measurement station acquires the wireless communication performance collected by the wireless base station that is the measurement target.

In the wireless communication performance measurement method of the wireless communication system of the first invention, the measurement station sets, as a wireless base station that is not the measurement target, a wireless base station using the same frequency channel as the wireless base station that is the measurement target and located at a distance where mutual wireless signals are detected.

Both the wireless base station that is the measurement target and the wireless base station that is not the measurement target send broadcast traffic at the same time. In addition, the wireless base station that is the measurement target sends traffic addressed to the subordinate wireless terminal station and the wireless base station that is not the measurement target sends broadcast traffic at the same time.

According to a second invention, there is provided a wireless communication performance measurement system including: a plurality of wireless base stations, each wireless base station including a wireless communication unit, a wireless information collection unit, and a measurement result collection unit; and a measurement station configured to control the plurality of wireless base stations, wherein the measurement station includes a unit configured to generate a measurement condition based on wireless environment information collected by the wireless information collection unit of each wireless base station and notify each wireless base station of a measurement control signal corresponding to the measurement condition, each wireless base station includes a unit configured to send traffic addressed to a subordinate wireless terminal station or broadcast traffic at the same time in accordance with the notified measurement control signal and cause a measurement result collection unit of a wireless base station that is a measurement target to measure wireless communication performance and notify the measurement station of the measured performance, and the measurement station acquires the wireless communication performance collected by the wireless base station that is the measurement target.

In the wireless communication performance measurement system of the second invention, the measurement station includes a unit configured to set, as a wireless base station that is not the measurement target, a wireless base station using the same frequency channel as the wireless base station that is the measurement target and located at a distance where mutual wireless signals are detected, and both the wireless base station that is the measurement target and the wireless base station that is not the measurement target send broadcast traffic at the same time.

In the wireless communication performance measurement system of the second invention, the measurement station includes a unit configured to set, as a wireless base station that is not the measurement target, a wireless base station using the same frequency channel as the wireless base station that is the measurement target and located at a distance where mutual wireless signals are detected, and the wireless base station that is the measurement target sends traffic addressed to the subordinate wireless terminal station and the wireless base station that is not the measurement target sends broadcast traffic at the same time.

According to a third invention, there is provided a wireless base station of a wireless communication performance measurement system, the wireless communication performance measurement system including a plurality of the wireless base stations and a measurement station, each wireless base station including a wireless communication unit, a wireless information collection unit, and a measurement result collection unit, the measurement station being configured to control the plurality of wireless base stations, in which the measurement station being configured to generate a measurement condition based on wireless environment information collected by the wireless information collection unit of each wireless base station and notify each wireless base station of a measurement control signal corresponding to the measurement condition, the wireless base station including a unit configured to send traffic addressed to a subordinate wireless terminal station or broadcast traffic at the same time in accordance with the notified measurement control signal and cause a measurement result collection unit of a wireless base station that is a measurement target to measure wireless communication performance and notify the measurement station of the measured performance.

Effects of the Invention

According to the present invention, it is possible to measure wireless communication performance in an area of a wireless base station that is a measurement target by causing each wireless base station to broadcast interference data without disposing a wireless terminal station for each wireless base station. In addition, a wireless terminal station is disposed only for a wireless base station that is a measurement target, the wireless base station performs unicast communication, and other wireless base stations that are not measurement targets broadcast interference data. Thus, it is possible to measure wireless communication performance in an area of the wireless base station that is the measurement target. This makes it possible to considerably reduce time and effort of work operation or preparation.

DESCRIPTION OF EMBODIMENTS

Figure 1:
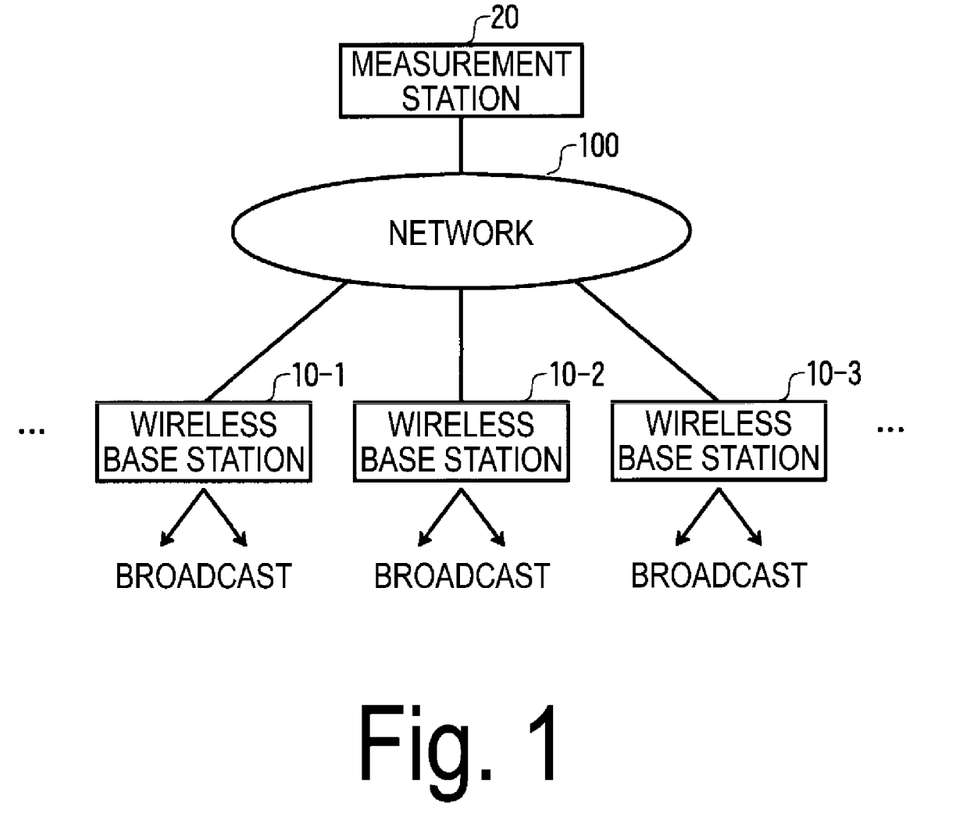
FIG. 1 is a diagram illustrating a first configuration example of a wireless communication performance measurement system of the present invention.

FIG. 1 illustrates a first configuration example of a wireless communication performance measurement system of the present invention.

In FIG. 1, a plurality of wireless base stations 10-1 to 10-3 and a measurement station 20 are connected to each other through a network 100, and each of the wireless base stations broadcasts interference data under control of the measurement station 20. Wireless communication performance of a wireless base station that is a measurement target is measured in an environment in which interference signals broadcasted from other wireless base stations are received.

Figure 2:
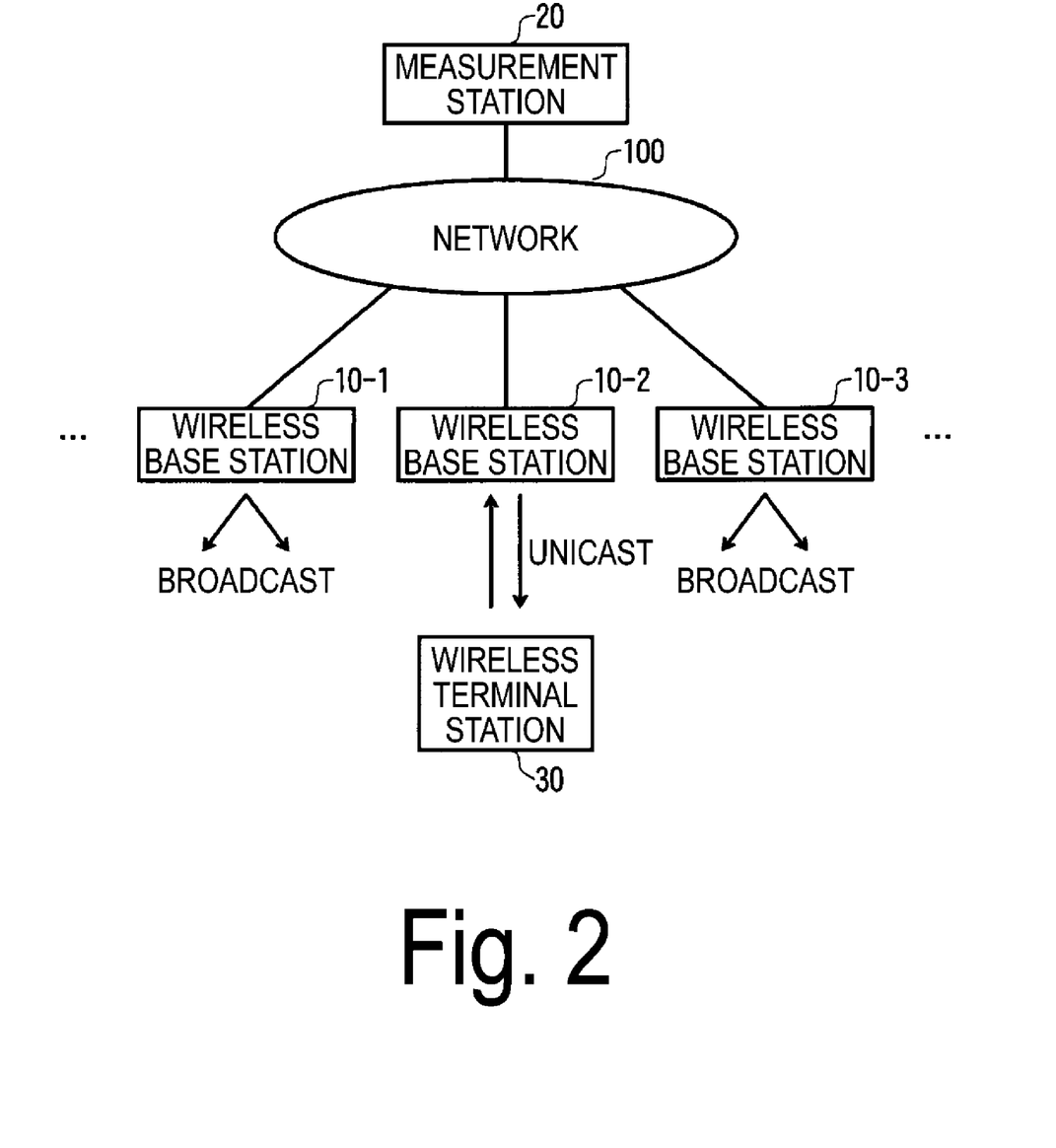
FIG. 2 is a diagram illustrating a second configuration example of the wireless communication performance measurement system of the present invention.

FIG. 2 illustrates a second configuration example of the wireless communication performance measurement system of the present invention.

In FIG. 2, the plurality of wireless base stations 10-1 to 10-3 and the measurement station 20 are connected to each other through the network 100, and there is a wireless terminal station 30 that is wirelessly connected to the wireless base station (here, 10-2) that is the measurement target. When the wireless base station 10-2 that is the measurement target performs unicast communication with the subordinate wireless terminal station 30, the wireless base stations 10-1 and 10-3 that are not the measurement targets broadcast interference data. Wireless communication performance of the wireless base station 10-2 that is the measurement target is measured in an environment in which interference signals broadcasted from other wireless base stations 10-1 and 10-3 are received.

Figure 3:
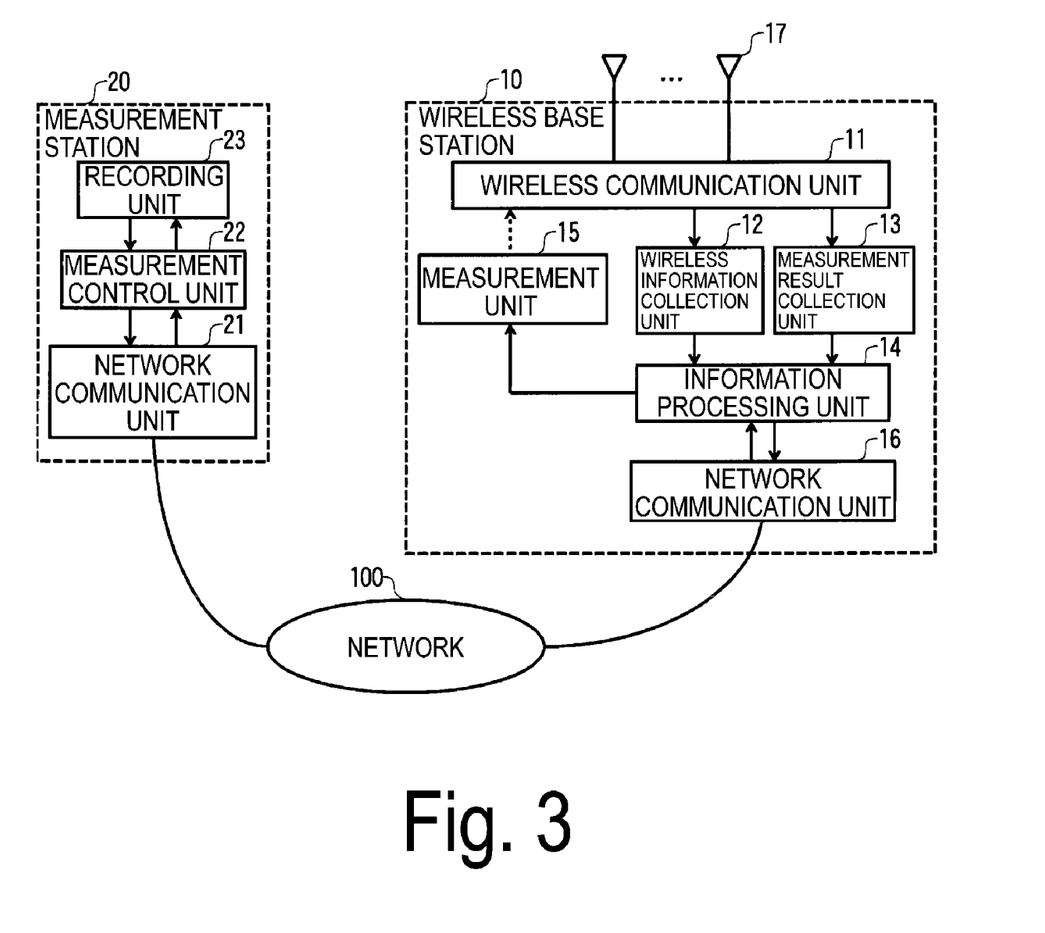
FIG. 3 is a diagram illustrating a configuration example of a wireless base station 10 and a measurement station 20.

FIG. 3 illustrates a configuration example of the wireless base station 10 and the measurement station 20. Here, the wireless base stations 10-1 to 10-3 are referred to collectively as the wireless base station 10.

In FIG. 3, the measurement station 20 includes a network communication unit 21, a measurement control unit 22, and a recording unit 23.

The network communication unit 21 acquires wireless base station information, wireless environment information, and wireless connection information from the wireless base station 10 through the network 100. The network communication unit 21 notifies the wireless base station 10 of a measurement control signal and a measurement start signal, and acquires a measurement result from the wireless base station 10.

The measurement control unit 22 acquires the wireless base station information, the wireless environment information, and the wireless connection information acquired from the wireless base station 10, and outputs the acquired information to the recording unit 23. Next, the measurement control unit 22 calculates a measurement condition based on the collected information, generates a measurement control signal corresponding to the measurement condition, and notifies the generated signal to the wireless base station 10 that is the measurement target and the wireless base stations 10 that are not the measurement targets. The measurement control unit 22 acquires the measurement result from the wireless base station 10 that is the measurement target, and outputs the acquired result to the recording unit 23. Meanwhile, the measurement control unit 22 sets, as a wireless base station that is not the measurement target, a wireless base station that uses the same frequency channel as the wireless base station 10 that is the measurement target and is located at a distance where mutual wireless signals are detected.

The recording unit 23 records the wireless base station information, the wireless environment information, a wireless connection state, the measurement condition, and the measurement result which are input from the measurement control unit 22. Upon a readout request, the recording unit 23 outputs the recorded information to the measurement control unit 22.

The wireless base station information is information relating to the communication performance of each wireless base station. Examples of the wireless base station information include a supported standard, the number of antennas, a maximum bandwidth, a maximum transmission rate, and support for transmission beam forming.

Figure 4:
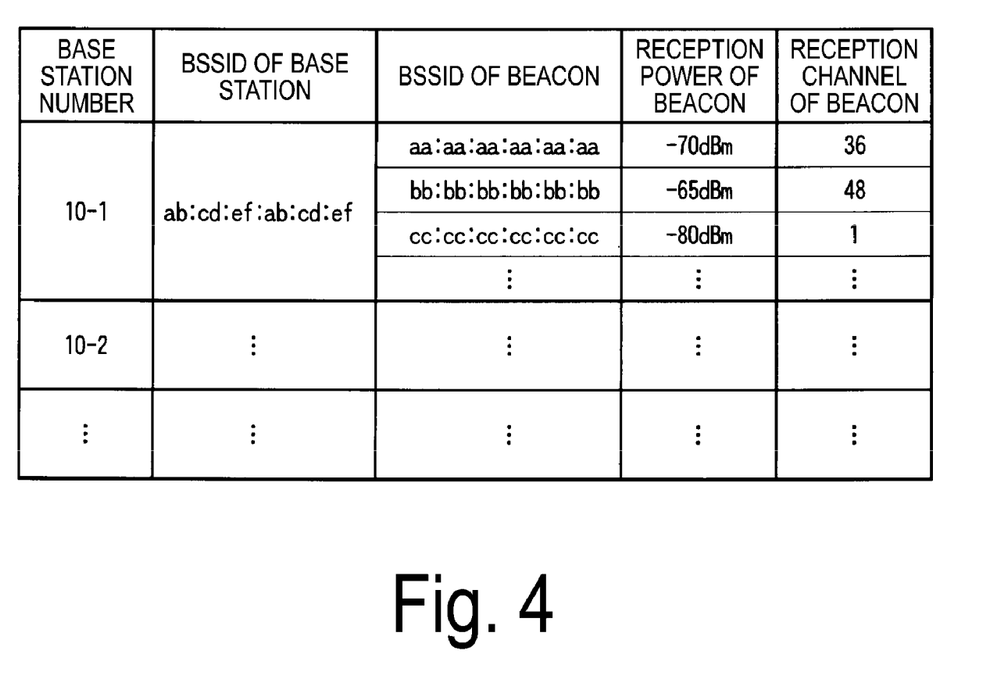
FIG. 4 is a diagram illustrating an example of wireless environment information.

The wireless environment information is information capable of being acquired from a beacon signal that each wireless base station 10 receives from a peripheral wireless base station. Examples of the wireless environment information include a base station number, a basic service set identifier (BSSID) of the own base station, a BSSID of a beacon, reception power of the beacon, and a reception channel of the beacon as illustrated in FIG. 4.

The wireless connection information is information relating to the communication performance or communication state of a wireless terminal station. Examples of the communication performance include a supported standard, the number of antennas, a maximum bandwidth, and support for transmission beam forming. Examples of the communication state include reception power and a reception signal-to-noise ratio (SNR).

Figure 5:
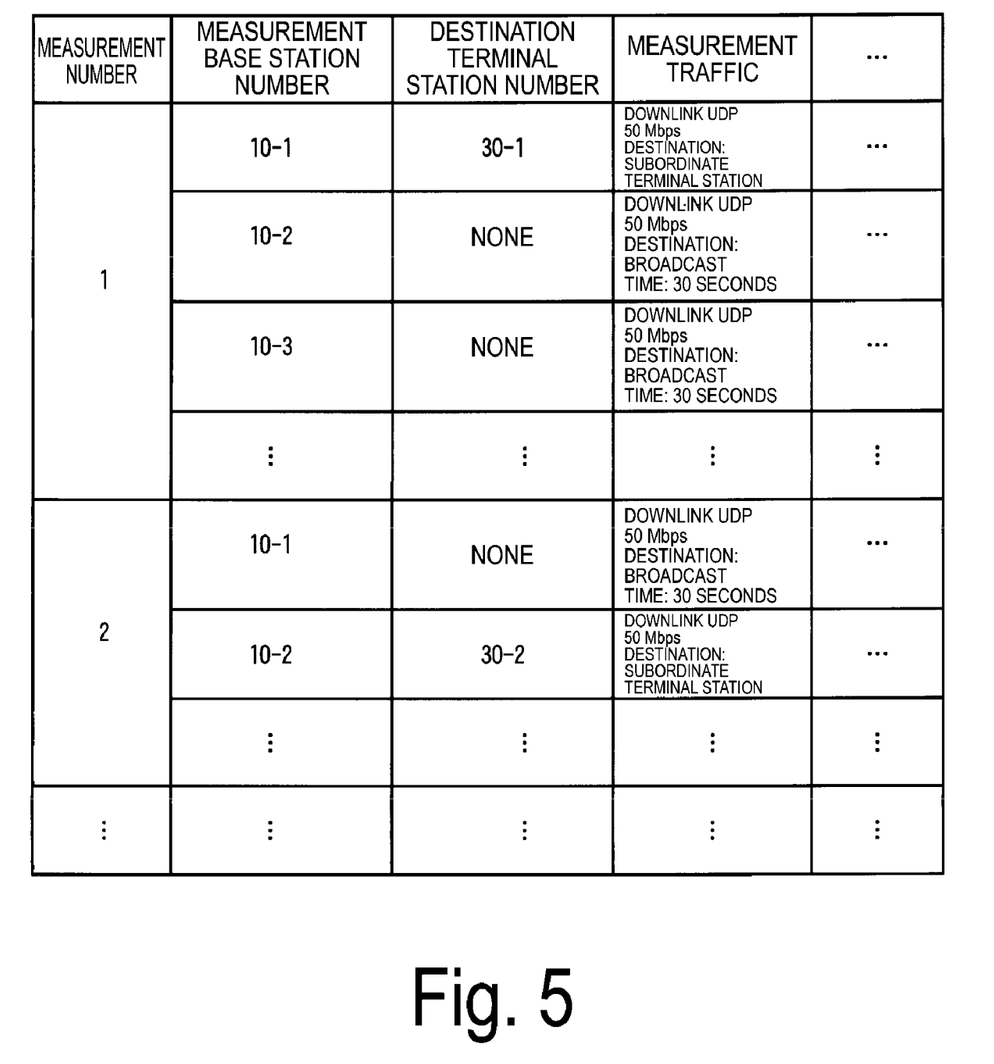
FIG. 5 is a diagram illustrating an example of measurement conditions.

Examples of the measurement condition include a measurement number, a measurement base station number, a destination terminal station number, and measurement traffic as illustrated in FIG. 5. Here, the measurement number 1 is an example in which the wireless base station 10-1 is a measurement target and is instructed to perform unicast communication with a subordinate wireless terminal station 30-1, and the wireless base stations 10-2 and 10-3 that are not measurement targets are instructed to perform broadcasting.

The measurement control signal is a signal for notifying the measurement condition to each wireless base station 10 from the measurement station 20. In addition, the measurement start signal is a signal for instructing, by the measurement station 20, each wireless base station 10 to start measurement.

Figure 6:
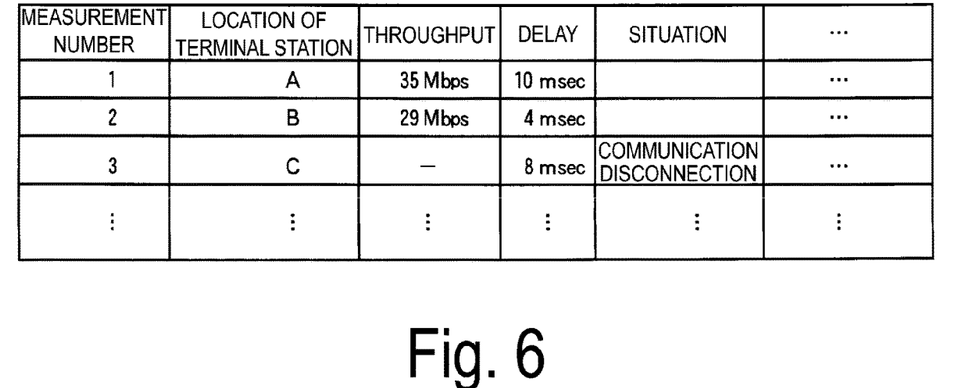
FIG. 6 is a diagram illustrating an example of measurement results.

The measurement result is a collection of results obtained by each wireless base station 10 performing performance measurement. Examples of the measurement result include a measurement number, a throughput, and a delay as illustrated in FIG. 6.

The measurement traffic is communication traffic flowing between the wireless base station and the wireless terminal station using an application for measurement, and can be set in consideration of a user usage method such as a destination, a packet size, a communication protocol, or a packet call timing.

While the measurement station 20 used in the present invention has been described, blocks typically mounted in the measurement station are omitted.

The wireless base station 10 includes a wireless communication unit 11, a wireless information collection unit 12, a measurement result collection unit 13, an information processing unit 14, a measurement unit 15, a network communication unit 16, and an antenna 17.

The wireless communication unit 11 demodulates a wireless signal received through the antenna 17, outputs the acquired wireless environment information, measurement control signal, and the like to the wireless information collection unit 12, and outputs the measurement result to the measurement result collection unit 13.

The wireless information collection unit 12 outputs the wireless environment information, the wireless connection information, and the like which are input from the wireless communication unit 11 to the information processing unit 14.

The measurement result collection unit 13 outputs the measurement result which is input from the wireless communication unit 11 to the information processing unit 14.

The information processing unit 14 outputs the measurement condition to the measurement unit 15 based on the measurement control signal acquired from the measurement station 20 through the network communication unit 16. The information processing unit 14 notifies the measurement station 20 of base station performance information of the own base station through the network communication unit 16. Further, the information processing unit 14 notifies the measurement station 20 of the wireless environment information and the wireless connection information which are input from the wireless information collection unit 12 and the measurement result which is input from the measurement result collection unit 13 through the network communication unit 16.

The measurement unit 15 transmits the measurement traffic generated by the wireless communication unit 11 from the antenna 17 and performs performance measurement based on the measurement condition which is input from the information processing unit 14.

The network communication unit 16 sends out the information which is input from the information processing unit 14 to the measurement station 20, and outputs the information which is input from the measurement station 20 to the information processing unit 14.

While the wireless base station 10 used in the present invention has been described above, blocks typically mounted in the wireless base station are omitted.

Figure 7:
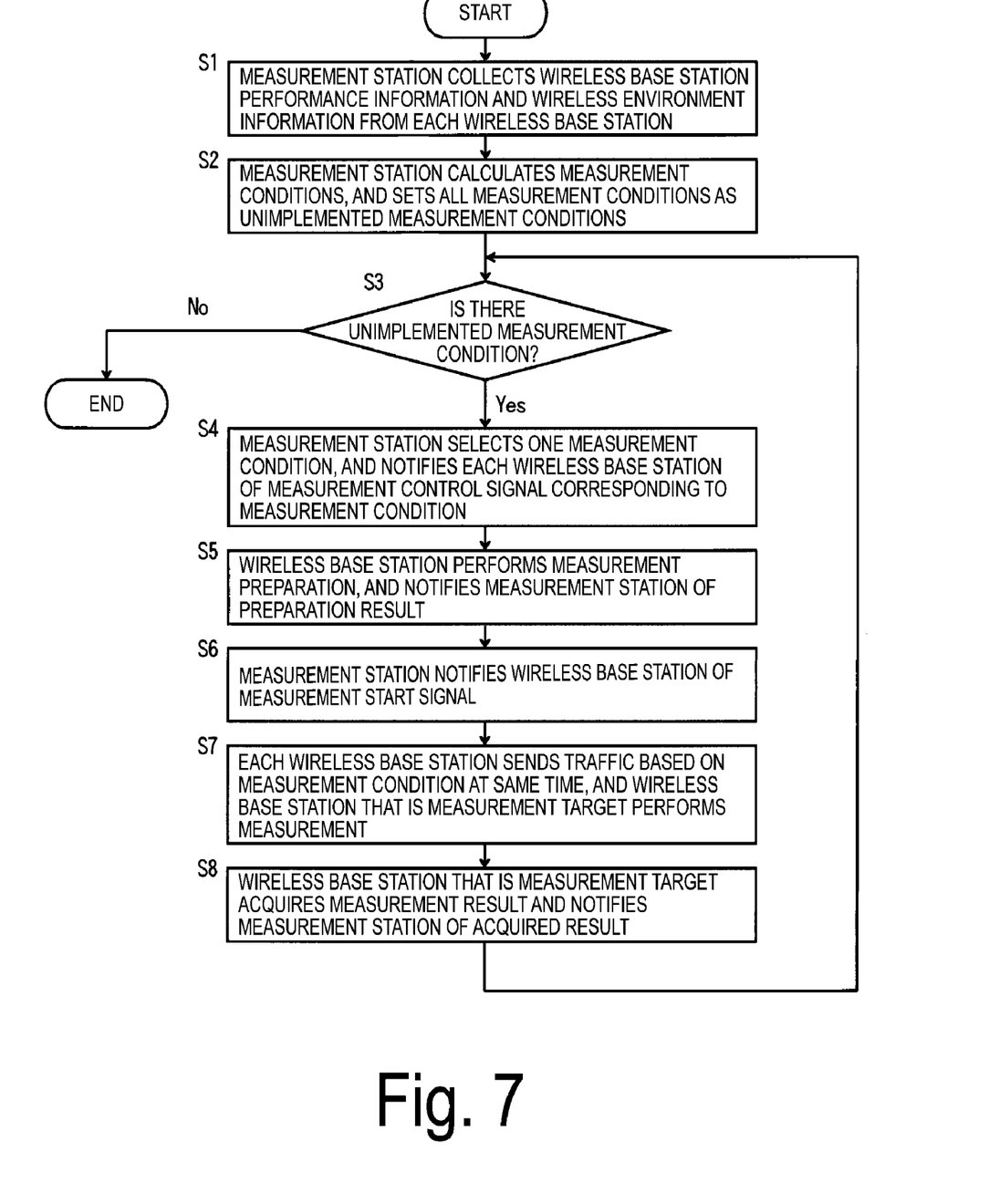
FIG. 7 is a flowchart illustrating processing of wireless communication performance measurement performed by the measurement station 20 and the wireless base station 10.

FIG. 7 illustrates a processing procedure of wireless communication performance measurement performed by the measurement station 20 and each wireless base station 10. In FIG. 7, the measurement station 20 collects wireless base station performance information and wireless environment information from each wireless base station 10 (step S1).

Next, the measurement station 20 calculates measurement conditions, and sets all the measurement conditions as unimplemented measurement conditions (step S2).

Meanwhile, in an example of a method of calculating the measurement conditions, the wireless base stations 10-1, 10-2, and 10-3 that can be measured are assumed to use the same frequency channel and to be located at a distance where mutual wireless signals are detected, for example, based on the wireless base station performance information and the wireless environment information. Here, for example, wireless communication performance measurement within the coverage area of the wireless base station 10-2 illustrated in FIG. 2 is performed as follows. The measurement station 20 sets a measurement condition in which the wireless base station 10-2 generates unicast communication traffic to the subordinate wireless terminal station 30, each of the wireless base stations 10-1 and 10-3 that are not the measurement targets is set to generate broadcast communication traffic without designating a specific wireless terminal station, and the unicast communication traffic and the broadcast communication traffic are sent at the same time.

That is, it is assumed that the measurement station 20 connects the wireless terminal station 30 only to the wireless base station 10-2 that is the measurement target and causes the wireless base stations 10-1 and 10-3 that are not the measurement targets to send broadcast traffic. This is because wireless environments of the wireless base station and the wireless terminal station are often different from each other in a wireless communication system, and it is necessary to evaluate the influence of an interference signal received by each wireless terminal station in a measurement target area. However, in the following case, the measurement station 20 can evaluate how much transmission traffic decreases even in a state where a wireless terminal station is not connected, and this can also be used as a performance measurement result. Here, the measurement station 20 transmits traffic to the broadcast address and use information on radio traffic that can be transmitted per unit time to thereby perform carrier sensing in accordance with radio wave interference between wireless base stations. The above case includes a case of an environment in which wireless communication environments of a wireless base station and a wireless terminal station are assumed to be approximately equal to each other such as a case where radiated radio waves of a wireless base station that is a measurement target are transmitted in almost all directions and the wireless terminal station communicates in the vicinity of the wireless base station.

This example is equivalent to FIG. 1.

Next, the measurement station 20 determines whether there are unimplemented measurement conditions (step S3), and if there are (Yes in step S3), the measurement station 20 selects one of the unimplemented measurement conditions and notifies the wireless base station 10 that is the measurement target of a measurement control signal corresponding to the selected measurement condition (step S4). Meanwhile, the measurement condition selected here may be selected in accordance with an order that is set in advance by a measurer, or may be freely selected. In a case where there are no unimplemented measurement conditions (No in step S3), the process ends.

Next, the wireless base station 10 performs measurement preparation of the own base station based on the notified measurement control signal, and notifies the measurement station 20 of the preparation result (step S5).

Next, the measurement station 20 notifies the wireless base station 10 of the measurement start signal (step S6).

Next, the wireless base stations 10 send traffic based on the measurement condition at the same time, and the wireless base station that is the measurement target performs measurement (step S7).

Next, after the measurement ends, the wireless base station 10 that is the measurement target acquires a measurement result to notify the measurement station 20 of the result (step S8), and the process returns to step S3.

In this manner, the measurement station 20 calculates the measurement condition based on collection information, instructs the wireless base station 10 to perform measurement preparation and measurement, and collects the result, thereby considerably reducing preparation required for the measurement and the amount of a measurement task. In addition, it is possible to minimize the number of wireless terminal stations by broadcasting interference traffic.

In addition, although measurement traffic is generated inside the wireless base station here, the present invention is not necessarily limited to this. For example, a measurement traffic generation server connected to each wireless base station may be prepared and traffic may be generated by the server.

The measurement station, the wireless base station, and the wireless terminal station in the above-described embodiment are not limited to those implemented by dedicated devices, and may be implemented by general-purpose computers. This may be achieved by recording a program for implementing this function in a computer readable recording medium, and causing a computer system to read and execute the program recorded in this recording medium. Meanwhile, the term "computer system" referred to here is assumed to include an OS and hardware such as peripheral devices. In addition, the term "computer readable recording medium" refers to a flexible disk, a magneto-optic disc, a ROM, a portable medium such as a CD-ROM, or a storage device such as a hard disk built into a computer system. Further, the "computer readable recording medium" may include recording mediums that dynamically hold a program during a short period of time like networks such as the Internet or communication lines when a program is transmitted through communication lines such as a telephone line, and recording mediums that hold a program for a certain period of time like a volatile memory inside a computer system serving as a server or a client in that case. In addition, the above-mentioned program may be a program which is used for realizing a portion of the aforementioned functions, may be a program which is capable of realizing the aforementioned functions in combination with programs previously recorded in the computer system, or may be a program which is realized using hardware such as a programmable logic device (PLD) or a field programmable gate array (FPGA).

REFERENCE SIGNS LIST

10 Wireless base station
11 Wireless communication unit
12 Wireless information collection unit
13 Measurement result collection unit
14 Information processing unit
15 Measurement unit
16 Network communication unit
17 Antenna
20 Measurement station
21 Network communication unit
22 Measurement control unit
23 Recording unit
30 Wireless terminal station
100 Network

The invention claimed is:

1. A wireless communication performance measurement method of a wireless communication system, the wireless communication system including a plurality of wireless base stations and a measurement station, the measurement station being configured to control the plurality of wireless base stations, the method comprising:
by the measurement station, generating a measurement condition based on wireless environment information collected by each wireless base station and notifying each wireless base station of a measurement control signal corresponding to the measurement condition;
by each wireless base station of the plurality of base stations that are not measurement targets, sending broadcast traffic in accordance with the notified measurement control signal,
by a wireless base station of the plurality of base stations that is a measurement target, sending traffic addressed to a subordinate wireless terminal station at the the same time as each wireless base station sends the broadcast traffic, wherein the wireless base station that is the measurement target measures wireless communication performance and notify the measurement station of the measured performance; and
by the measurement station, acquiring the wireless communication performance collected by the wireless base station that is the measurement target.

2. The wireless communication performance measurement method of the wireless communication system according to claim 1, wherein the measurement station sets, as the wireless base station that is not the measurement target, a wireless base station using the same frequency channel as the wireless base station that is the measurement target and located at a distance where mutual wireless signals are detected.

3. The wireless communication performance measurement method of the wireless communication system according to claim 2, wherein both the wireless base station that is the measurement target and the wireless base station that is not the measurement target send broadcast traffic at the same time.

4. The wireless communication performance measurement method of the wireless communication system according to claim 2, wherein the measurement station connects the wireless terminal station only to the wireless base station that is the measurement target and causes the wireless base stations that are not the measurement targets to send broadcast traffic.

5. The wireless communication performance measurement method according to claim 1, further comprises:
using the measurement station, collecting wireless base station performance information and wireless environment information from each wireless base station;
using the measurement station, calculating a plurality of measurement conditions;
setting all of the plurality of measurement conditions as unimplemented measurement conditions; and
determining whether an unimplemented measurement condition exists based on the measurement conditions.

6. The wireless communication performance measurement method according to claim 5, further comprises:
using the measurement station, selecting one measurement condition of the plurality of measurement conditions when an unimplemented measurement condition exists; and
using the measurement station, transmitting to each wireless base station of the plurality of base stations a measurement control signal corresponding to the one measurement condition.

7. The wireless communication performance measurement method according to claim 5, further comprises:
by each wireless base station, performing a preparation result; and
by each wireless base station, notifying the measurement station of the preparation result.

8. The wireless communication performance measurement method according to claim 6, further comprises:
by each wireless base station that is not the measured target, broadcasting interference data based on the measurement condition, wherein the wireless communication performance of the wireless base station that is the measured target is measured in an environment in which the interference data is broadcasted from other wirelesses base stations are received.

9. The wireless communication performance measurement method according to claim 7, further comprises:
by the wireless based station that is the measured target, performing a unicast communication with the subordinate wireless station; and
by other bases station that are not the measured target, broadcasting interference data based on the measurement condition; wherein the wireless communication performance of the wireless based station that is the measured target is measured in an environment in which the interference data is broadcasted from other wirelesses base stations are received.

10. The wireless communication performance measurement method according to claim 5, further comprises by each wireless base station, sending traffic based on the one measurement condition at the same time, wherein the wireless station that is the measurement target performs measurement.

11. The wireless communication performance measurement method according to claim 10, further comprises:
by the wireless station that is the measurement target, acquiring one or more measurement results; and
notifying the measurement station of the acquired results.

12. A wireless communication performance measurement system comprising:
a plurality of wireless base stations; and a measurement station configured to control the plurality of wireless base stations, wherein the measurement station is configured to generate a measurement condition based on the wireless environment information collected by each wireless base station of the plurality of wireless base stations and notify each wireless base station of a measurement control signal corresponding to the measurement condition, each wireless base station of the plurality of base stations that are not measurement targets being configured to send broadcast traffic in accordance with the notified measurement control signal, a wireless base station of the plurality of base stations that is a measurement target configured to send traffic addressed to a subordinate wireless terminal station at the the same time as each wireless base station sends the broadcast traffic, wherein the wireless base station that is the measurement target measures wireless communication performance and notify the measurement station of the measured performance, and wherein the measurement station being configured to acquire the wireless communication performance collected by the wireless base station that is the measurement target.

13. The wireless communication performance measurement system according to claim 12, wherein the measurement station being configured to set, as the wireless base station that is not the measurement target, a wireless base station using the same frequency channel as the wireless base station that is the measurement target and located at a distance where mutual wireless signals are detected, and both the wireless base station that is the measurement target and the wireless base station that is not the measurement target send broadcast traffic at the same time.

14. The wireless communication performance measurement system according to claim 12, wherein the measurement station being configured to set, as a wireless base station that is not the measurement target, a wireless base station using the same frequency channel as the wireless base station that is the measurement target and located at a distance where mutual wireless signals are detected, and the wireless base station that is the measurement target sends traffic addressed to the subordinate wireless terminal station and the wireless base station that is not the measurement target sends broadcast traffic at the same time.

15. A wireless communication performance measurement system including a plurality of the wireless base stations and a measurement station, wherein the measurement station being configured to control the plurality of wireless base stations, the measurement station being configured to generate a measurement condition based on wireless environment information collected by each wireless base station and notify each wireless base station of a measurement control signal corresponding to the measurement condition, a given wireless base station of the plurality of wireless base stations comprising:

a processor; and a storage medium having computer program instructions stored thereon, when executed by the processor, perform to;

send traffic addressed to a subordinate wireless terminal station or broadcast traffic accordance with the notified measurement control signal, wherein when the given wireless base station is a wireless base station that is a measurement target, the given wireless base station is configured to send traffic addressed to the subordinate wireless terminal station at the same time as another wireless base station that is not a measurement target broadcasts traffic, and wherein the given wireless base station that is the measurement target is further configured to measure wireless communication performance and notify the measurement station of the measured performance.

\* \* \* \* \*